United States Patent Office 3,843,506
Patented Oct. 22, 1974

3,843,506
METHOD OF MAKING INTERNAL HALF CELL
Paul Jerrold-Jones, Claremont, Calif., assignor to Beckman Instruments, Inc.
Original application June 19, 1972, Ser. No. 263,782, now Patent No. 3,793,176. Divided and this application Sept. 19, 1973, Ser. No. 398,663
Int. Cl. G01n 27/30
U.S. Cl. 204—195 F          8 Claims

ABSTRACT OF THE DISCLOSURE

An electrochemical electrode internal half cell in which the conductor is sealed within a plastic shrink tube by means of an inner layer of plastic having a melting temperature less than that of the shrink tube. A porous plug closes one end of the tube and the section of the tube between the plug and the seal is packed with a mixture of a metal and a sparingly soluble salt of the metal. Methods of making the internal half cell are described.

This is a division of our copending application Ser. No. 263,782, filed June 19, 1972, now U.S. Pat. No. 3,793,176.

BACKGROUND OF THE INVENTION

Field of the Invention

This invention relates to electrochemical electrodes and, more particularly, to an internal half cell for electrochemical electrodes.

Description of the Prior Art

This invention relates to an internal half cell component for the measurement of electromotive force which includes a metal and a salt of the metal that will produce an electromotive force when inserted into a solution of the salt. In the application of this type of half cell, the salt is usually only sparingly soluble and is in equilibrium with its saturated solution, the solution forming a portion of the complete electrode system. The voltage generated by the internal half cell when inserted into the solution is a function of the concentration of ions in the solution of the species formed by the salt.

This type of internal half cell is widely used in reference electrodes for ion potential measurements. Such internal half cells are also used in electrochemical electrode structures employing ion sensitive barriers and used as indicating electrodes for the measurement of the ion concentrations of solution.

The internal half cell of the present invention is applicable to either reference or indicating electrodes. However, the invention will be described herein with respect to only reference electrodes.

An electrochemical reference electrode utilized for ion potential measurements ordinarily comprises a salt bridge tube containing a salt solution in which the internal half cell is immersed. Electrical connection between the salt solution and the sample or test solution is made by liquid contact via a suitably formed aperture or passage in the tube, generally referred to as the liquid junction structure. In certain types of reference electrodes the internal half is in the form of a glass tube which is filled with a mixture of an electrochemically active metal and a sparingly soluble salt of the metal. The most widely used materials are silver and silver chloride mixtures and mercury and mercurous chloride mixtures, the latter normally being referred to as a calomel mixture. An aperture is provided in the glass tube to provide communication between the aforesaid mixture and the solution contained in the salt bridge tube of the electrode. Electrical contact is provided to the mixture by means of a wire which is sealed in the glass tube. In order to provide an effective seal, the wire is normally formed of platinum which has a coefficient of thermal expansion very close to that of glass and thus is sealable in glass. While such internal half cells are certainly effective from a functional standpoint, they require a relatively high degree of skill to fabricate. Moreover, the glass internal half cell must be annealed during the electrode production process, thus adding to the cost of manufacture. The requirement for the conductor of the internal half cell being formed of platinum also adds to the cost of the structure. In addition, being formed of glass, the conventional internal half cell is somewhat fragile. Thus, what is desired is an internal half cell for electrochemical electrodes which overcomes the aforementioned disadvantages of the conventional glass internal half cell.

SUMMARY OF THE INVENTION

The principal object of the present invention is to provide a relatively low cost and unbreakable internal half cell for an electrochemical electrode and a method for making the same.

According to the principal aspect of the present invention, there is provided an internal half cell for an electrochemical electrode which is formed of a plastic material and thus does not require the use of a platinum conductor. The half cell is constructed by placing a conductor coaxially within a plastic shrink tube. A layer of the plastic having a melting temperature less than that of the shrink tube surrounds the conductor at a point spaced from one end of the tube. The tube is heated to a temperature sufficient to soften said plastic layer and shrink the tube so that the conductor will become sealed to the shrink tube by means of the intermediate plastic layer. Preferably the sides of the shrink tube are squeezed during the sealing operation to assure that a complete seal is made. The shrink tube is then filled with a suiting packing material comprising a metal and a sparingly soluble salt of the metal and the end of the tube is then closed with a porous plug thereby completing the structure of the internal half cell. The resulting internal half cell, being formed of plastic, is flexible and thus more rugged than the conventional glass half cells of the prior art. Moreover, the internal half cell of the present invention is less expensive to manufacture since it requires less skill to fabricate, no annealing step is required, and the invention eliminates the need for using a platinum wire as the conductor for contacting the packing material within the half cell.

DESCRIPTION OF THE PREFERRED EMBODIMENTS

Figure 1:
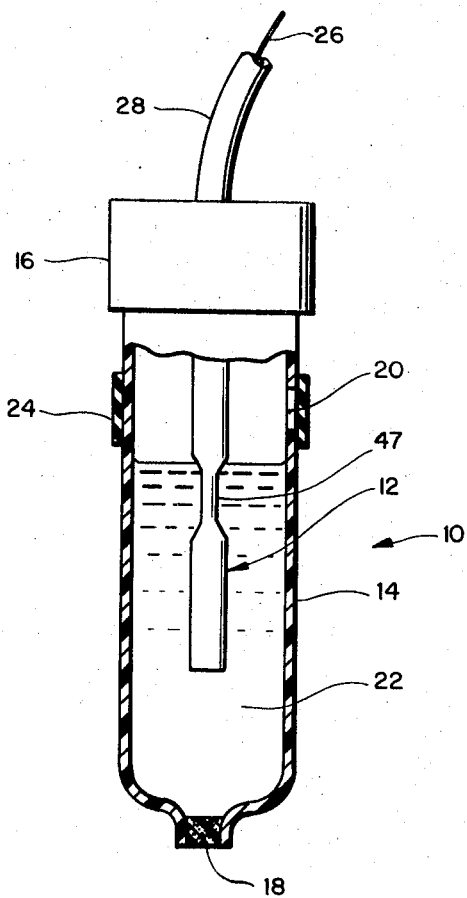
FIG. 1 is a partial longitudinal sectional view of an electrochemical reference electrode employing the internal half cell of the present invention.

Referring now to the drawing in detail, there is shown in FIG. 1 an electrochemical reference electrode, generally designated 10, incorporating the internal half cell 12 of the present invention. The electrode comprises a tubular body 14 closed at its upper end by means of a cap 16. A liquid junction structure 18 closes the lower end of the tube. An opening 20 is provided in the wall of the tube 14 for permitting filling of the interior of the tube with a suitable salt solution 22, typically saturated potassium chloride. An elastomeric sleeve 24 surrounds the tube 14 for closing the opening 20. The internal half cell 12 is positioned in the tube 14 so as to be immersed in the salt solution 22. The conductor for the internal half cell 12, not shown in FIG. 1, is connected to the conductor 26 of a cable 28 which extends from the cap 16 of the electrode and is adapted to be connected to a conventional high impedance voltmeter, such as a pH meter (not shown).

The tube 14 of the electrode 10 may be formed of any suitable nonconductive material which is not attacked by the salt solution 22 or samples which are to be tested. Preferably the tube is formed of a plastic material, such as polyvinyl chloride, polytetrafluoroethylene (Teflon), nylon, polyethylene, or the like. The liquid junction structure 18 is in the form of a porous plug, such as a porous ceramic or porous plastic plug, which is cemented in the tube 14. Alternatively, the tube 14 may be constructed of the plastic material disclosed in copending application of Neti et al. Ser. No. 65,898, filed Aug. 21, 1970, assigned to the assignee of the present application and the liquid junction structure 18 may be formed by making the lower end of the tube in the form of a thin ion permeable wall as taught in said copending application. Of course the tube 14 could also be made of glass in the conventional manner if desired.

Figure 2:
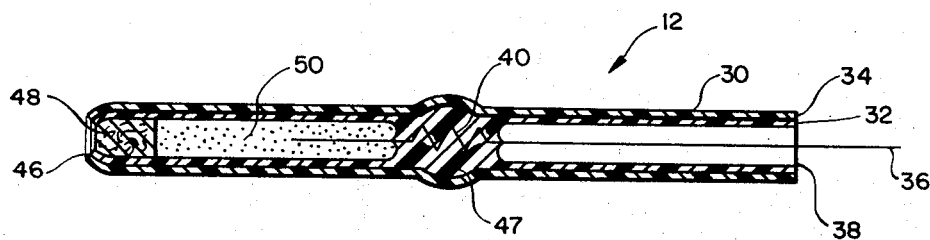
FIG. 2 is an enlarged longitudinal sectional view of the internal half cell illustrated in FIG. 1.
Figure 3:
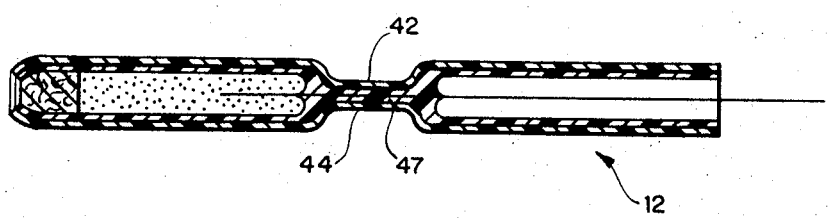
FIG. 3 is a sectional view similar to FIG. 2 except that the half cell is rotated 90° about its longitudinal axis.

Reference is now made to FIGS. 2 and 3 which illustrate the structure of the internal half cell 12 of the present invention. The half cell 12 comprises a double wall cylindrical plastic tube 30 including an inner layer 32 and an outer layer 34. The outer layer is plastic shrink tubing while the inner layer 32 is formed of a plastic material which has a melting temperature less than that of the shrink tubing layer 34. The shrink tube layer 34 is characterized by contracting when heat is applied thereto. Suitable shrinkable plastics are polyolefins, polypropylene and polyvinyl chloride. A suitable plastic for the inner layer 32 is polyethylene. A suitable two layer shrink tube product 30 suitable for practicing the present invention is sold under the trade name "Thermofit SCL" by Raychem Corporation of Menlo Park, Calif.

The conductor 36 for the internal half cell is preferably a wire which is unreactive with the salt of the packing material for the half cell. Any noble metal would be suitable. As mentioned previously, the wire 36 need not be formed of platinum, which is the most expensive of the noble metals. When the packing material for the internal half cell is a mercury-mercurous chloride mixture, the wire 36 may be suitably formed of palladium. When the packing material contains silver chloride, the wire 36 may be formed of silver and, if so, the silver particles may be eliminated from the packing mixture.

As best seen in FIG. 2, the wire 36 extends partway into the tube 30 with one end of the wire extending beyond the end 38 of the tube so that it will be exposed and thus may be suitably connected by soldering or like to the conductor 26 of the cable 28 during assembly of the electrode 10. The wire 36 is formed with several bends at the region 40 whereat the wall of the tube 30 is constricted to provide relatively flat areas 42 and 44 as best seen in FIG. 3. Preferably the bends are formed in the wire 36 so as to lie in a single plane which is parallel to the surfaces 42 and 44 of the tube 30. As seen, a portion of the inner layer 32 of the tube 30 intermediate the opposite ends 38 and 46 of the tube completely surrounds and is bonded to the wire in the region 40 thereof to form a seal in the area indicated by reference numeral 47. A porous plug 48, formed of packed cotton, porous ceramic, or the like, closes the end 46 of the tube 30. A packing material 50 of an electrochemically active metal and a sparingly soluble salt of the metal, such as any of the materials discussed hereinbefore, fills the space in the tube 30 between the seal 47 and the porous plug 48.

Before mounting the internal half cell 12 in the electrode 10, it is charged with electrolyte, preferably saturated potassium chloride. This may be accomplished by immersing the half cell in a container of boiling electrolyte which will cause the electrolyte to fill the voids in the packing material 50. Alternatively, the internal half cell may be immersed in a container of electrolyte and a vacuum applied thereto to evacuate the voids in the packing material. Thereafter the vacuum is released and atmospheric pressure forces the electrolyte solution into the internal half cell to fill the voids in the packing material. Thereafter, the exposed end of the wire 36 is connected by solder to the conductor 26 of cable 28 and then the internal half cell 12 is mounted in the salt bridge tube 14 by potting the same therein with a suitable resin (not shown).

The bends 40 formed in the wire 36 are a desirable feature in order to prevent the wire from twisting or shifting longitudinally in the tube 30 when the internal half cell 12 is being assembled into the salt bridge tube. Otherwise, the seal formed between the plastic layer 32 and the wire 36 may be damaged thereby producing an electrolyte leak path through the sealing area 47. Moreover, if by chance a leak path does exist anywhere between the plastic 32 and wire 36, the bent portion 40 of the wire provides a relatively long path which would minimize the chance of electrolyte leakage across opposite sides of the seal 47.

Figure 4:
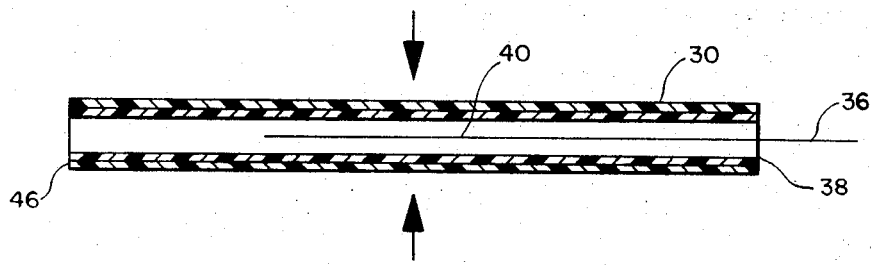
FIGS. 4–6 illustrate various stages of fabrication of the internal half cell of the invention.

The manner of making the internal half cell 12 will now be described. Initially the wire 36 is formed with the bends 40 therein. The wire is then inserted through the end 38 of the two layer plastic tubing 30. The plane in which the bends of the wire 36 lie extends perpendicular with respect to the sheet of drawing illustrating FIG. 4. Heat is then applied to the tube 30 at the location indicated by the arrows in FIG. 4 which causes the outer shrink tube or layer 34 to contract and the inner layer 32 to soften until the inner layer becomes sealed to the wire 36 over the entire region of the bends 40 in the wire. Preferably pressure is also applied to the tube 30 in the direction indicated by the arrows illustrated in FIG. 4 simultaneously with the application of the heat thereto. After cooling, the assembly takes the form illustrated in FIG. 5 of the drawing. The mixture of metal and sparingly soluble salt of the metal 50 is then packed in the lefthand end 46 of the tube 30 and the porous plug 48 is positioned in the tube with its outer face 52 spaced slightly from the end 46 of the tube. The region of the tube between the seal 47 and the end 46 is then heated to contract the outer layer 34 and compress the packing material 50 and plug 48 within the tube. The end 46 of the tube is then rolled over a heated surface to constrict the same as shown in FIGS. 2 and 3 whereby the plug 50 will be firmly retained in the assembly.

Figure 5:
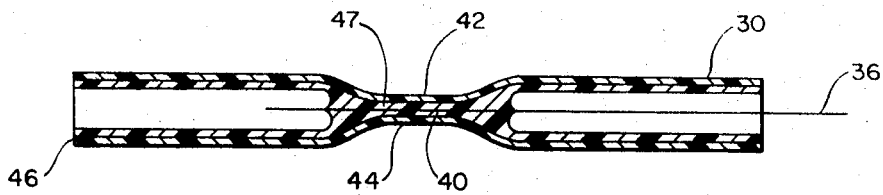
Figure 6:
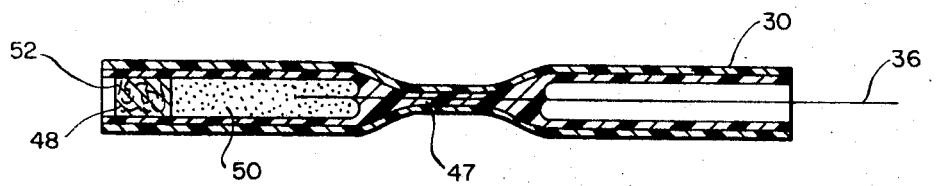

The internal half cell 12 can also be constructed by initially coating the bent portion 40 of the conductor 36 with a suitable relatively low melting temperature plastic such as polyethylene. Thereafter the coated conductor is positioned in a plastic shrink tube formed of the same material as the layer 34 of the tube 30. Thereafter heat and pressure are applied to the shrink tube intermediate its ends in the same manner as described in connection with the assembly shown in FIG. 4 whereby the polyethylene layer will soften and the shrink tube will contract and become sealed to such layer thus forming an assembly as illustrated in FIG. 5. The construction of the internal half cell is then completed in the manner described above.

It will be appreciated that by the present invention there is provided an inexpensive and simple method for forming a flexible and unbreakable internal half cell for an electrochemical electrode. The internal half cell is less expensive than conventional glass internal half cells in that it does not require the use of a platinum conductor which is sealable to glass. Moreover the method of the present invention requires less tooling and less mechanical skill than is required to produce a glass internal half cell.

It will be understood that various changes can be made in the form, details, arrangement and proportions of the

What is claimed is:

1. A method of making an internal half cell for an electrochemical electrode comprising the steps of:
providing a plastic shrink tube having a separate inner layer of plastic thereon, said inner layer having a melting temperature less than that of said tube;
inserting a conductor lengthwise in said tube;
forming a seal between said inner layer and said conductor at a point spaced from at least one end of the tube by heating said tube to a temperature sufficient to soften said inner layer and shrink said tube;
packing said tube between said seal and said one end with a mixture of a metal and a sparingly soluble salt of said metal; and
closing said one end of said tube with a porous plug.

2. A method as set forth in claim 1 including the step of applying pressure to the sides of said tube during the forming of said seal.

3. A method as set forth in claim 1 including the steps of:
forming a plurality of bends in said conductor prior to inserting said conductor in said tube; and
positioning said conductor in said tube so that said bends therein are located at the point where said seal is formed.

4. A method as set forth in claim 1 including the step of heating the portion of said tube between said seal and said one end to shrink said tube about said mixture and said plug.

5. A method of making an internal half cell for an electrochemical electrode comprising the steps of:
coating a portion of an elongated conductor with a plastic layer;
inserting said coated conductor in a plastic shrink tube having a melting temperature higher than that of said layer;
forming a seal between said layer and said tube at a point spaced from at least one end of said tube by heating said tube to a temperature sufficient to soften said layer and shrink said tube;
packing said tube between said seal and said one end with a mixture of a metal and a sparingly soluble salt of said metal; and
closing said one end of said tube with a porous plug.

6. A method as set forth in claim 5 including the step of applying pressure to the sides of said tube during the forming of said seal.

7. A method as set forth in claim 5 including the step of heating the portion of said tube between said seal and said one end to shrink said tube about said mixture and said plug.

8. A method as set forth in claim 5 including the steps of:
forming a plurality of bends in said conductor prior to coating said conductor; and
coating said conductor with said layer in the region of said bends.

References Cited

UNITED STATES PATENTS

| | | | |
|---|---|---|---|
| 3,562,130 | 2/1971 | Hoole et al. | 204—195 M |
| 3,705,089 | 12/1972 | Grubb | 204—195 F |
| 3,708,411 | 1/1973 | Vanslette | 204—195 M |
| 3,530,056 | 9/1970 | Haddad | 264—342 R |
| 3,575,834 | 4/1971 | Hoole et al. | 264—342 R |
| 3,347,970 | 10/1967 | Hanna | 264—342 R |
| 2,559,231 | 7/1951 | Seemar | 264—342 R |

TA-HSUNG TUNG, Primary Examiner

U.S. Cl. X.R.

264—234, 342 R